United States Patent
Aron

(10) Patent No.: US 7,278,560 B2
(45) Date of Patent: Oct. 9, 2007

(54) MOTORCYCLE SADDLEBAG MOUNTING SYSTEM AND APPARATUS

(76) Inventor: Mathew Randolph Aron, 2181 Willow St., San Diego, CA (US) 92106

( * ) Notice: Subject to any disclaimer, the term of this patent is extended or adjusted under 35 U.S.C. 154(b) by 0 days.

(21) Appl. No.: 11/136,270

(22) Filed: May 23, 2005

(65) Prior Publication Data

US 2006/0261110 A1    Nov. 23, 2006

(51) Int. Cl.
B62J 7/04        (2006.01)
B62J 9/00        (2006.01)

(52) U.S. Cl. .................................. 224/413; 224/423

(58) Field of Classification Search ............ 224/412, 224/413, 419, 422, 423, 428, 429, 430, 431, 224/441, 447, 451, 457
See application file for complete search history.

(56) References Cited

U.S. PATENT DOCUMENTS

| | | | |
|---|---|---|---|
| 3,791,563 A * | 2/1974 | Raat ........................... 224/457 |
| D247,775 S * | 4/1978 | Watson-O'Hara .......... D12/410 |
| 4,096,980 A | 6/1978 | Clow |
| 4,176,771 A * | 12/1979 | Dubroc, Sr. ................. 224/412 |
| 4,511,155 A * | 4/1985 | Galloway .................... 280/204 |
| 4,802,682 A | 2/1989 | Yasuji |
| 4,809,891 A | 3/1989 | Patrin |
| 5,207,361 A * | 5/1993 | Slifka ......................... 224/419 |
| 5,558,260 A | 9/1996 | Reichert |
| 5,664,715 A | 9/1997 | Gogan et al. |
| 5,725,138 A | 3/1998 | Zagrodnik |
| 5,732,965 A | 3/1998 | Willey |
| 5,762,249 A | 6/1998 | Hann |
| 5,931,360 A | 8/1999 | Reichert |
| 6,053,384 A | 4/2000 | Bachman |
| 6,068,075 A * | 5/2000 | Saiki .......................... 180/219 |
| 6,123,239 A | 9/2000 | Lovitt |
| 6,234,266 B1 * | 5/2001 | Saiki .......................... 180/219 |
| 6,293,450 B1 | 9/2001 | Aron |
| 6,299,042 B1 | 10/2001 | Smith |
| 6,349,783 B1 | 2/2002 | Galbraith |
| 6,354,476 B1 | 3/2002 | Alderman |
| 6,378,643 B1 | 4/2002 | Galbraith |
| 6,505,765 B1 | 1/2003 | Proctor et al. |
| 6,520,275 B2 | 2/2003 | Galbraith |
| 6,547,114 B2 | 4/2003 | Smith |
| 6,793,110 B2 | 9/2004 | Hamilton |
| 6,817,501 B1 | 11/2004 | Rogers et al. |
| 6,820,782 B1 | 11/2004 | Monson |
| 6,830,169 B1 | 12/2004 | Campbell |
| 6,832,710 B2 | 12/2004 | Galbraith |

(Continued)

OTHER PUBLICATIONS

Cyclevisions "Designs in Motion" catalog, Sep. 2003, pp. 1-8.

*Primary Examiner*—Nathan J. Newhouse
*Assistant Examiner*—Justin M. Larson

(57) ABSTRACT

A motorcycle saddlebag mounting system is provided. In one embodiment, the motorcycle saddlebag mounting system provides a rigid mount for large, or hard motorcycle saddlebags on motorcycles that previously were unable to carry large or hard saddlebags. This Abstract is provided for the sole purpose of complying with the Abstract requirement rules that allow a reader to quickly ascertain the subject matter of the disclosure contained herein. This Abstract is submitted with the explicit understanding that it will not be used to interpret or to limit the scope or the meaning of the claims.

10 Claims, 3 Drawing Sheets

U.S. PATENT DOCUMENTS

2003/0209581 A1* 11/2003 Adams ...................... 224/413
2004/0232183 A1 11/2004 Watanabe 2005/0150921 A1* 7/2005 Schneider ................... 224/413

* cited by examiner

MOTORCYCLE SADDLEBAG MOUNTING SYSTEM AND APPARATUS

FIELD OF THE INVENTION

The present invention generally relates to motorcycles. More particularly, the invention concerns a motorcycle saddlebag mounting system and apparatus.

BACKGROUND OF THE INVENTION

The popularity of motorcycling continues to increase. Riders are attracted to the freedom of the open road, leaving behind the cares and worries of everyday life. Motorcycle manufacturers have seized upon the recent surge in popularity and have been selling motorcycles and accessories in record numbers.

One targeted group of consumers are "baby boomers" who now are in their 40's and 50's, and thus have the disposable income to splurge on a new toy for the garage. However, these ageing "boomers" demand their comforts. So, motorcycle dealers, and after-market shops are catering to the boomers by installing soft comfortable seats, large fairings to block the wind, and saddlebags to carry virtually any desired necessity.

Motorcycle saddlebags come in a variety of shapes and sizes. Hard, soft, easily removeable, lockable, big and small. But, some motorcycles are not built with the necessary saddlebag mounting points. Or, the mounting points that are provided are inadequate for the size and type of saddlebag that the consumer wants.

Therefore, there exists a need for a system an apparatus for mounting a motorcycle saddlebag to virtually any motorcycle.

BRIEF DESCRIPTION OF THE DRAWINGS

Various embodiments of the present invention taught herein are illustrated by way of example, and not by way of limitation, in the figures of the accompanying drawings, in which.

Figure 1:
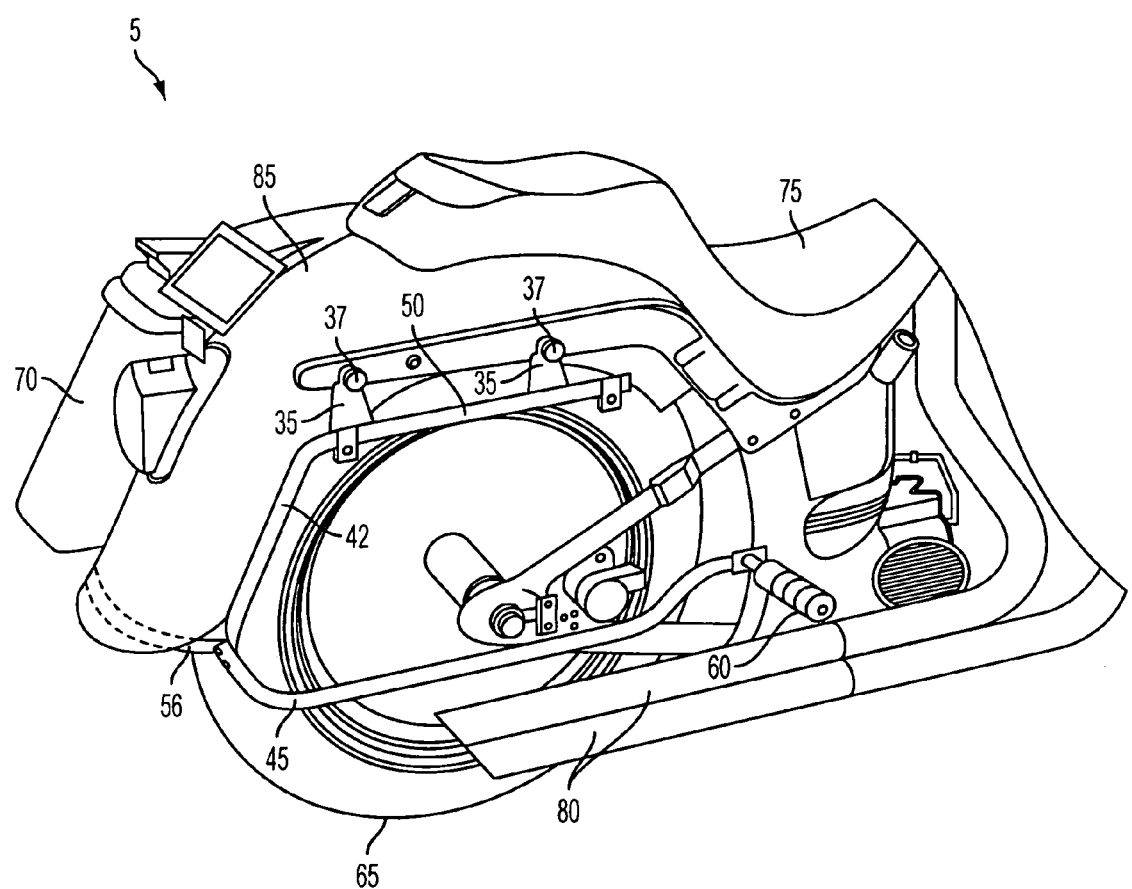
FIG. 1 is a perspective view of one embodiment of the present invention mounted on a motorcycle.

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

Features and advantages of the present invention will be appreciated from review of the following detailed description of the invention, along with the accompanying figures in which like reference numerals are used to describe the same, similar or corresponding parts in the several views of the drawings.

DETAILED DESCRIPTION OF EMBODIMENTS OF THE INVENTION

In the following paragraphs, the present invention will be described in detail by way of example with reference to the attached drawings. While this invention is capable of embodiment in many different forms, there is shown in the drawings and will herein be described in detail specific embodiments, with the understanding that the present disclosure is to be considered as an example of the principles of the invention and not intended to limit the invention to the specific embodiments shown and described. That is, throughout this description, the embodiments and examples shown should be considered as exemplars, rather than as limitations on the present invention. Descriptions of well known components, methods and/or processing techniques are omitted so as to not unnecessarily obscure the invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Motorcycles have been in production for over 100 years, built by manufacturers such as Aprilla, BMW, Buell, Ducati, Harley-Davidson, Honda, Indian, Kawasaki, Moto Guzzi, Suzuki, Triumph, Victory, Yamaha, and others. It will be appreciated that the present invention may be installed on any motorcycle built by the above-listed manufacturers, or other un-named manufacturers (some, or all of the above-listed manufacturer names may be registered trademarks of their respective owners).

One manufacturer that has become very popular in the United States, as well as throughout the world, is Harley-Davidson. Harley-Davidson manufactures many different models of motorcycles, which may be generally categorized into five different types: Touring models, Softail models, Sportster models, Dyna Glide models, and V-Rod models (Harley-Davidson is a registered trademark of H-D Michigan, Inc., of Ann Arbor Mich.).

For example, touring models may include the FLHT Electra Glide standard, FLHTC Electra Glide classic, FLHTCU Ultra Classic Electra Glide, FLHTP Electra Glide police, FLHS Electra Glide sport, FLHR Road King, FLHRC Road King classic, FLHP Road King police, FLTC Tour Glide classic, FLTCU Ultra classic tour Glide, FLTR Road Glide, FLHRS Road King custom, FLHRI Road King, FLHRSI Road King custom, FLHRCI Road King classic, FLTRI Road Glide, FLHTI Electra Glide standard, FLHTCI Electra Glide classic, and the FLHTCUI Ultra Classic Electra Glide (some or all of the above model names may be registered trademarks of H-D Michigan, Inc., of Ann Arbor Mich.).

Sportster models may include the Sportster XL883, Sportster XL883L, Sportster XL883C, Sportster XL883C custom, Sportster XL883R, Sportster XLH883, Sportster XLH883 Hugger, Sportster XLH883 Deluxe, Sportster XL1200C, Sportster XL1200C custom, Sportster XL1200R, Sportster XL1200R Roadster, Sportster XLH1200, and the Sportster 1200S Sport (some or all of the above model names may be registered trademarks of H-D Michigan, Inc., of Ann Arbor Mich.).

Dyna Glide models may include the FXD Dyna Super Glide, FXDX Dyna Super Glide sport, FXDXT Dyna Super Glide T-sport, FXDL Dyna Low Rider, FXDP Dyna Defender, FXDS-CONV Dyna Convertible, FXDWG Dyna Wide Glide, FXDC/I Super Glide Custom, FXDI Dyna Super Glide, FXDXI Dyna Super Glide sport, FXDCI Super Glide custom, FXDLI Dyna Low Rider, and the FXDWGI Dyna Wide Glide (some or all of the above model names may be registered trademarks of H-D Michigan, Inc., of Ann Arbor Mich.).

V-Rod models may include the VRSCA V-Rod, VRSCB V-Rod, and the VRSCR Street Rod (some or all of the above model names may be registered trademarks of H-D Michigan, Inc., of Ann Arbor Mich.).

Softail models may include the FXST Softail Standard, FXSTI Softail Standard, FXSTB Night Train, FXSTBI Night Train, FXSTSI Springer Softail, FXSTDI Deuce, FLSTF Fat Boy, FLSTFI Fat Boy, FLSTFI Fat Boy 15$^{th}$ Anniversary Special Edition, FLSTNI Softail Deluxe, FLSTSCI Softail Springer Classic, FLSTC Heritage Softail Classic, FLSTCI Heritage Softail Classic, FLSTN Heritage Softail Special, FLSTS Heritage Springer, FXSTC Softail Custom, FXSTD Softail Deuce, FXSTS Springer Softail, and the FXSTSB Bad Boy (some or all of the above model names may be registered trademarks of H-D Michigan, Inc., of Ann Arbor Mich.).

Clearly, Harley-Davidson manufactures many different motorcycle models. It will be appreciated that the present invention may be installed on any of the above-listed models, or on other models yet to be manufactured. In addition, the present invention may be installed on a "custom" motorcycle, which is a motorcycle that differs from a manufacturer-produced model. For example, a custom motorcycle may be a Harley-Davidson FXST Softail Standard that has had specific parts either added, removed or modified. Or, a custom motorcycle may be built from scratch, using no, or very few pre-manufactured parts, such as only the engine, transmission and tires.

"Softail" is a term that is generally used to describe a motorcycle that appears to have a "hard-tail" but in reality has shock absorbers that are hidden from view (usually underneath the motorcycle). The shock absorbers, in conjunction with pivoting rear suspension members, absorb the bumps encountered while riding. "Hard-tail" refers to a motorcycle that has no rear suspension. Put differently, the rear wheel is mounted directly to one or more rigid frame members that do not move relative to other frame members. This results in a very uncomfortable ride, as the jarring from riding over bumps is transferred directly to the rider.

For example, the shock absorbers on the Harley-Davidson softail models, such as the FXST Softail Standard are mounted underneath the motorcycle, and pivotally connect to several pivoting members, including the rear "swing arm" which is the frame member that connects the rear wheel to the motorcycle. The unique shock arrangement on the Harley-Davidson softails requires a unique swing arm, that has a pivot point that is much lower than the swing arm pivot point on a conventional motorcycle that has a shock absorber mounted directly to the swing arm.

Figure 2:
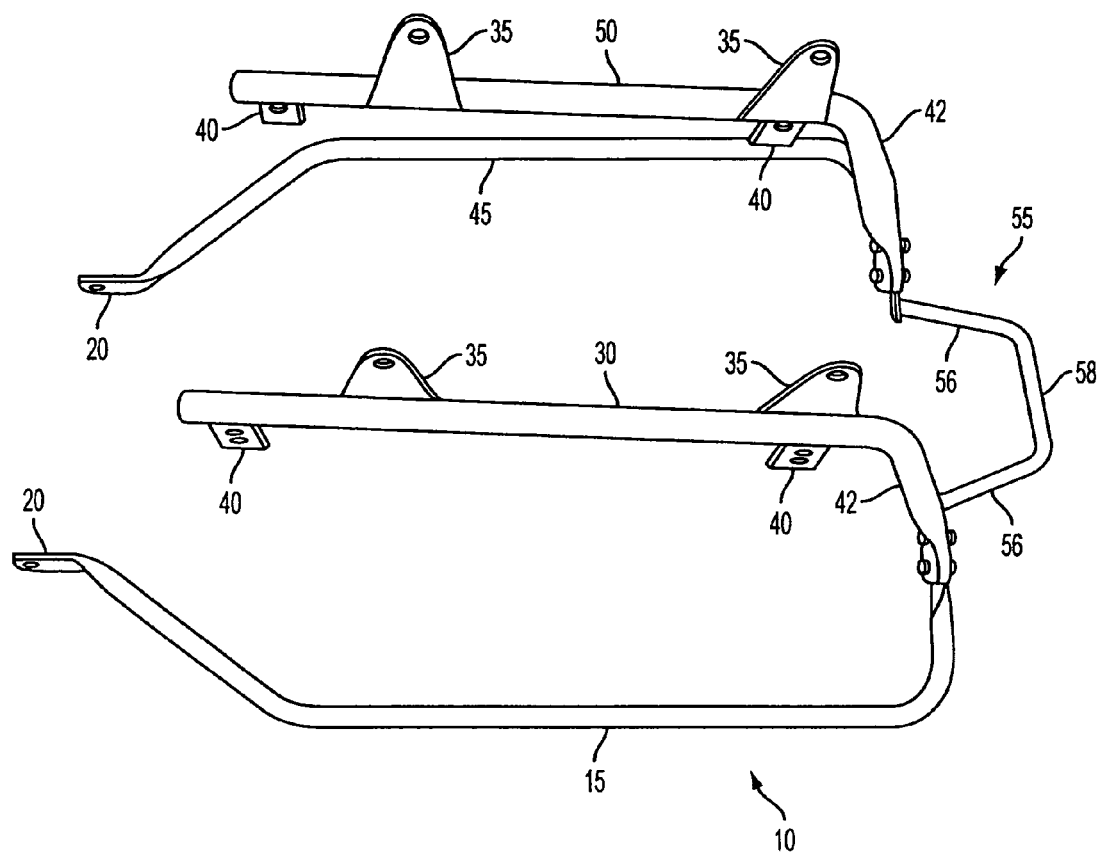
FIG. 2 is a left-side perspective view of the embodiment of the present invention shown in FIG. 1.
Figure 3:
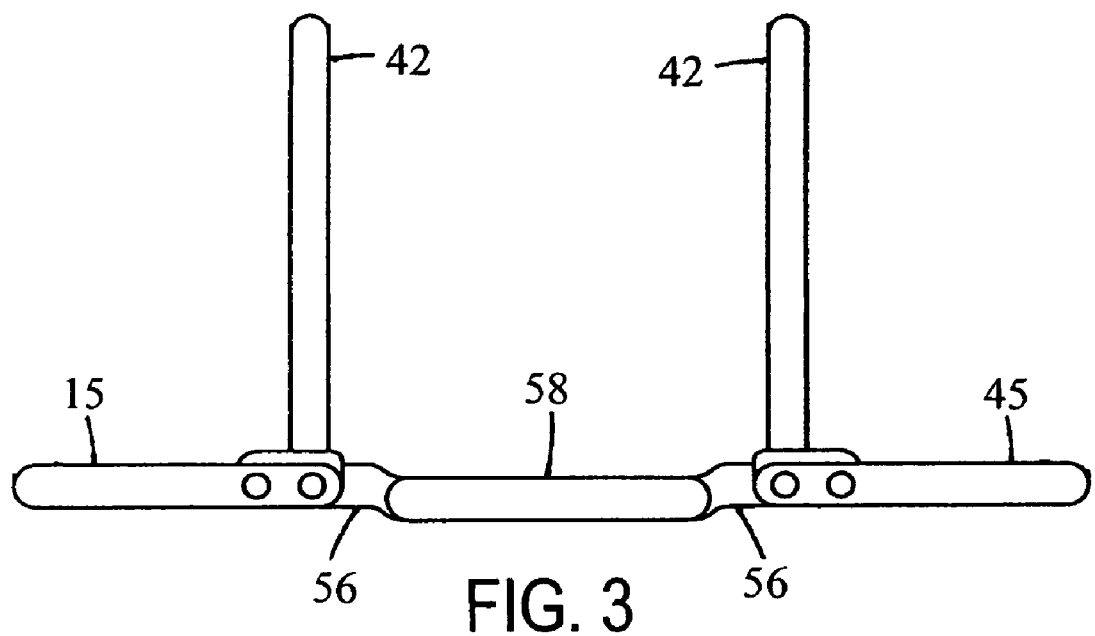
FIG. 3 is a rear elevation view of the embodiment of the present invention shown in FIG. 1.

One feature of the present invention is that a saddlebag mounting system 10 (as shown in FIGS. 1-3) can be attached to a motorcycle without using the swing arm pivot point as an attachment point. In addition, the saddlebag mounting system 10 does not need to attach to a rear mounting point that on some motorcycle models, is located adjacent to the tip of the rear fender.

Referring now to FIG. 1, a rear portion of a motorcycle 5 is illustrated. To provide a clear explanation of embodiments of the invention, terms such as "front," "rear," left" and "right" will be used. These terms are defined from the perspective of a motorcycle operator sitting on the seat 75 of the motorcycle 5. Thus, the "right" side of the motorcycle is the side illustrated in FIG. 1, for example, which shows the exhaust pipes 80 on the "right" side. The "left" side is only partially illustrated, and includes the left saddlebag 70. The "front" of the motorcycle 5 is generally comprised of portions of the motorcycle 5 that are located in front of the seat 75, such as the gas tank (not shown), handlebars (not shown), and the front wheel and tire (not shown). The "rear" of the motorcycle 5 is generally comprised of portions of the motorcycle 5 that are located under the seat 75, and behind the seat 75, such as the rear wheel 65, and the left saddlebag 70. It will be appreciated that "front" and "rear" are terms of approximation, and are used mainly to orient the reader.

Shown in FIG. 1 are two right side saddlebag mounting points 37. Two matching saddlebag mounting points 37 (not shown) are located on the left side of the motorcycle 5. Many motorcycles only have these saddlebag mounting points 37 on each side of the motorcycle. It will be appreciated that with just two points to attach a saddlebag, only smaller saddlebags that can only carry relatively small loads can be installed. This is because, in part, the saddlebag mounting points 37 are located along only one horizontal plane, and thus generally only provide support that resists gravity and forward and aft loads (i.e., front and back loads), but do not resist side-to-side loads. This may cause the saddlebags to move from side-to-side, which shifts the weight in the saddlebag from side-to-side, causing an unsafe riding condition.

It must be remembered that motorcycles are dynamic machines that vibrate, as well as produce vertical and horizontal loadings from irregularities in the road surface, as well as forces encountered while negotiating corners. Thus, motorcycles present a severe environment that includes vibration, vertical and horizontal g-loadings (i.e., vertical and horizontal forces), and an environment that is open to the forces of nature, such as wind, rain, hail, sleet and snow.

It will be appreciated that saddlebags come in many different sizes and shapes. A "saddlebag" is either a soft or a hard container that is attached adjacent to one side of a rear wheel 65 of a motorcycle 5. Generally, they are installed in pairs, and they provide storage for various items. Some saddlebags are made of leather and have flap lids that are fastened to the saddlebag through buckles. These soft saddlebags may be fastened to the bike with leather laces or other detachable devices. Hard saddlebags can be made of plastic, fiberglass, metal or other materials and are usually permanently attached to the motorcycle 5 by using bolts or other types of fasteners. FIG. 1 illustrates a portion of a "hard" left-side saddlebag 70. One advantage of a hard saddlebag is that it may be lockable, and thus provides some security from theft.

Riders who want to attach a hard saddlebag, or just a large saddlebag to their motorcycles cannot use only the two saddlebag mounting points 37. Most hard and/or large saddlebags need at least a third mounting point. This forces a rider to purchase a motorcycle that has three saddlebag mounting points on each side of the motorcycle, or to only attach smaller, and/or soft saddlebags. For example, in addition to the two saddlebag mounting points 37, a third saddlebag mounting point (not shown) is usually provided adjacent to the tip, or end point of the rear fender 85. The third mounting point is substantially lower than the two saddlebag mounting points 37, enabling large, and hard saddlebags to be mounted, as the third, low mounting point is on a different horizontal plane than the two saddlebag mounting points 37, creating a rigid triangular mounting plane for the large saddlebags.

For riders who want large, or hard saddlebags, their choices of motorcycle models is limited to models that include the third, low mounting point. For example, all Harley-Davidson Softail models, as listed above, only have the two saddlebag mounting points 37 on each side of the motorcycle 5, as illustrated in FIG. 1. Thus, a rider who wants a large, or hard saddlebag would not purchase a Harley-Davidson Softail model, as it does not have the third, low mounting point. This is true for many other motorcycle models as well.

One feature of the present invention is that it allows large, hard, and other types of saddlebags to be mounted to motorcycles only having two saddlebag mounting points 37 on each side of the motorcycle 5. Yet, the present invention provides secure attachment for the saddlebag, eliminating any side-to-side movement of the saddlebag, and enabling the mounting of large, or hard saddlebags to motorcycles that previously only could be fitted with smaller, or soft saddlebags. This is accomplished without using a third, low mounting point that is located adjacent to the tip, or end point of the rear fender 85.

Referring now to FIG. 2, one embodiment of the saddlebag mounting system 10 of the present invention is illustrated. This embodiment is shown removeably attached to the motorcycle 5 in FIG. 1. Generally, the saddlebag mounting system 10 comprises two lower rearward extending members, two upper members that removeably couple to the saddlebag mounting points 37 and a rear coupler, that removeably couples all the members together. One feature of this arrangement is that by being coupled together, side-to-side loads are supported, and side-to-side movement of a mounted saddlebag is eliminated. Yet, the present invention does not attach to a third, low mounting point adjacent to the tip of the rear fender, nor does it attach to the swing arm pivot point.

As shown in FIG. 2, the saddlebag mounting system 10 comprises a first lower member 15, a second lower member 45, a first upper member 30, a second upper member 50, and a coupler 55. The first lower member 15 mounts on the left side of the motorcycle 5, and the second lower member 45 mounts on the right side of the motorcycle 5. In some embodiments, these members may be interchangeable. The forward section of each of the first and second lower members 15 and 45 includes and aperture 20 that provides an attachment point to the motorcycle 5. In a preferred embodiment, the aperture 20 is positioned around a stud, or projection that is used to attach the rear footrest 60 to the motorcycle 5 (shown in FIG. 1). That is, the rear footrest 60 is removed from its mount, the aperture 20 is placed around the mount (usually a threaded stud), and the rear footrest 60 is re-attached to the motorcycle 5. For example, the bolt that attaches the rear footrest 60 to the frame is typically received in a hole, or aperture in the frame and has a threaded shank that extends through the hole in the frame. The bolt is either secured to the frame with a nut, or the rear footrest 60 may contain a threaded aperture that threads onto the bolt, securing the bolt, and the rear footrest 60 to the frame.

The first and second upper members 30 and 50, respectively, include saddlebag attachment flanges 40 that comprise apertures that are used to mount a saddlebag to the saddlebag mounting system 10. Generally, a saddlebag is bolted, or otherwise attached to the saddlebag attachment flanges 40. FIG. 1 shows the left saddlebag 70 mounted to the motorcycle 5 via the saddlebag attachment flanges 40.

The first and second upper members 30 and 50 also include motorcycle attachment flanges 35 that each have an aperture for positioning about the saddlebag mounting points 37 located on the motorcycle 5. Generally, the saddlebag mounting points 37 comprise a threaded stud, or other type of projection, and the apertures located on the motorcycle attachment flanges 35 are positioned about the studs. A nut, or other type of fastener is then secured to each saddlebag mounting point 37, securely attaching the first or second member 30 or 50 to the motorcycle 5. For example, FIG. 1 shows an upper member 50 mounted on the right side of motorcycle 5. In some embodiments, the first and second upper members 30 and 50 may be interchangeable.

As shown in FIGS. 1 and 2, each of the first and second upper members 30 and 50 are substantially L-shaped. That is, the section that includes the two motorcycle attachment flanges 35 comprises the longer side of the "L" and a second portion 42 forms the short side of the "L" (as shown in FIG. 3) The angle between the two sections is greater than 90 degrees, but it will be appreciated that this angle may vary, including equal to or less than 90 degrees. As shown in FIG. 3, the second portion 42 couples to the first and second lower members 15 and 45, respectively. As shown in FIG. 2, this coupling arrangement is repeated by the first upper member 30 and the first lower member 15. In one embodiment, the coupling is achieved by providing an aperture near the end of each member (as shown in FIG. 3), and securing the members together by using a threaded bolt and nut, rivet, or other type of fastener.

By coupling the upper and lower members (15 to 30, and 45 to 50) together at their rear sections, a very rigid saddlebag mounting system 10 is provided. To further increase rigidity, a rear coupler 55 is provided. As shown in FIG. 1, preferably the rear coupler 55 is positioned underneath the rear fender 85. This improves the aesthetics of the motorcycle 5, but it will be appreciated that the rear coupler 55 may be positioned so that it is more visible. The rear coupler 55 is somewhat "U" shaped, with legs 56 that extend at angles relative to the base 58. The specific shape of the rear coupler 55 may vary, as long as it is sized to removeably attach to the left and right side members of the saddlebag mounting system 10. One feature of the present invention is that the rear coupler 55 is not attached to the rear fender 85, eliminating the need for unsightly fasteners on the lower rear fender 85 or a third, low mounting point.

Referring now to FIG. 3, in a preferred embodiment, the right leg 56 includes two apertures that are aligned with two apertures in the rear portion of the second lower member 45, and two apertures in the second portion 42 of the second upper member 50. All three pairs of apertures are aligned, and a fastener, such as a threaded bolt and nut, rivet, or other type of fastener is used to removeably couple all three members together. As shown in FIGS. 2 and 3, this arrangement is repeated on the left side of the saddlebag mounting system 10.

By coupling the left side and right side members together (15 and 30 coupled to 45 and 50 by the rear coupler 55), the side-to-side loads created by large, or hard saddlebags can be supported, yet no third, low mounting point is required.

The saddlebag mounting system 10 eliminates any side-to-side movement, greatly enhancing motorcycle safety by eliminating any load shifting. That is, the rear coupler 55 provides support and stability for saddlebags. Bigger, heavier, bags can be fitted without worry as to any vibration or other unwanted movement of the saddlebags.

Another embodiment of the present invention includes quick release fasteners that allow the saddlebag mounting system 10 to be quickly removed from the motorcycle 5. In one embodiment, a quick release fastener includes a first coupling portion and a second coupling portion that can be removeably coupled and uncoupled with one another in a quick-release manner. These quick release fasteners are installed in place of the fasteners used to attach the saddlebag mounting system 10 to the motorcycle 5.

To quickly attach the saddlebag mounting system 10 to the motorcycle 5, one orients the saddlebag assembly such that each second coupling portion is adjacent to each first coupling portion and their axes are parallel with one another. For example, the saddlebag mounting system 10 may be held such that each second coupling portion is slightly above each first coupling portion. One can then lower the saddlebag until the bolt head of each second coupling portion is fully received in the slot of one of the first coupling portions. The saddlebag mounting system 10 does not tend to slip off of the motorcycle because the enlarged head is captured in the slot. The saddlebag mounting system 10 can be removed by reversing these steps. Further details of a quick release mechanism for removing either the saddlebag mounting system 10 from the motorcycle 5 or removing a saddlebag from the saddlebag mounting system 10 are disclosed in U.S. Pat. No. 6,293,450 (in the name of Mathew R. Aron, and titled: Quick Release Mechanism for Motorcycle Saddlebag), which is referred to and incorporated herein in its entirety by this reference.

It will be appreciated that other embodiments of the present invention may be constructed. For example, the rear coupler 55 as a separate component may be eliminated. In this embodiment, the first and second lower members 15 and 45 may each extend to include a respective portion of the rear coupler 55. In this case, the rear coupler 55 is eliminated, and now incorporated into the lower members 15 and 45. Alternatively, only one of the first and second lower members 15 or 45 may include the rear coupler 55. For example, in this embodiment, the first lower member 15 simply incorporates a substantially "U" shaped section (comprising the shape of the rear coupler 55), which couples directly to the second lower member 45. In another embodiment, the rear coupler 55 is incorporated into the first and second upper members 30 and 50. In this embodiment, each second portion 42 includes a portion of the shape of the rear coupler 55. Alternatively, a single-piece component may comprise the first and second lower members 15 and 45 and the rear coupler 55. In this embodiment, the first and second upper members 30 and 50 may simply attach to the single-piece component. In a similar vein, a single-piece component may comprise the first and second upper members 30 and 50 and the rear coupler 55. Again, in this embodiment, the first and second lower members 15 and 45 would simply couple to the single-piece component.

Thus, the specific embodiments of the invention described above should be considered as non-limiting examples which are presented to illustrate various features of the present invention. The examples are intended merely to facilitate an understanding of ways in which the invention may be practiced and to further enable those of skill in the art to practice the invention. Accordingly, the examples should not be construed as limiting the scope of the invention.

Thus, it is seen that a motorcycle saddlebag mounting system and apparatus is provided. One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A motorcycle saddlebag mounting device structured to removeably attach to a motorcycle having a left and a right side and left and right footrests removeably attachable to corresponding left and right footrest elements, where the left and right footrest elements are not a swing arm pivot point, the saddlebag mounting device comprising:
    a left elongate member removeably attachable to the left motorcycle footrest element;
    a right elongate member removeably attachable to the right motorcycle footrest element;
    a substantially L-shaped left member removeably attachable to at least one left motorcycle mounting element;
    a substantially L-shaped right member removeably attachable to at least one right motorcycle mounting element, where each substantially L-shaped member comprises a substantially vertically extending portion attachable to a respective one of the left and right elongate members, and a substantially horizontally extending portion having a cantilevered free end, with a bent portion between the substantially horizontally extending portion and the substantially vertically extending portion, such that the substantially horizontally extending portion extends only in one direction from the substantially vertically extending portion; and
    a coupler structured to removeably attach to the left and right elongate members, where each of the left and right members include two motorcycle attachment elements and two saddlebag attachment elements.

2. The motorcycle saddlebag mounting device of claim 1, where each of the left and right motorcycle footrest elements comprise a projection selected from a group consisting of: a threaded bolt, a threaded shank, and a stud.

3. The motorcycle saddlebag mounting device of claim 1, where the left and right members are substantially L-shaped.

4. The motorcycle saddlebag mounting device of claim 1, where the left and right members are removeably attached to the motorcycle by several quick-release fasteners.

5. The motorcycle saddlebag mounting device of claim 1, where the left member removeably attaches to two motorcycle mounting points located on a left side of a motorcycle fender and the right member removeably attaches to two motorcycle mounting points located on a right side of the motorcycle fender.

6. The motorcycle saddlebag mounting device of claim 1, where the coupler removeably attaches to both the left and right members.

7. The motorcycle saddlebag mounting device of claim 1, where the coupler is positioned between a motorcycle rear fender and a motorcycle rear wheel.

8. A motorcycle saddlebag mounting device removeably attachable to a motorcycle having a front, a rear, a left side, a right side, and left- and right-side footrests removeably attachable to corresponding left- and right-side footrest elements, where the footrest elements are not a swing arm pivot point, the motorcycle saddlebag device comprising:
    a left-side elongated member removeably attachable to the left-side motorcycle footrest element, and positioned to extend rearward from the footrest element;

a right-side elongated member removeably attachable to the right-side motorcycle footrest element, and positioned to extend rearward from the footrest element;

a substantially L-shaped left-side member removeably attachable to two left-side motorcycle fender mounting points;

a substantially L-shaped right-side member removeably attachable to two right-side motorcycle fender mounting points, where each substantially L-shaped member comprises a substantially vertically extending portion attachable to a respective one of the left- and right-side elongate members, and a substantially horizontally extending portion having a cantilevered free end, with a bent portion between the substantially horizontally extending portion and the substantially vertically extending portion, such that the substantially horizontally extending portion extends only in one direction from the substantially vertically extending portion; and a coupler, structured to removeably attach the left-side and right-side elongated members and the left-side and right-side substantially L-shaped members together, where the coupler is positioned between a motorcycle rear fender and a motorcycle rear wheel.

9. The motorcycle saddlebag mounting device of claim 8, where each of the left-side and right-side motorcycle footrest elements comprise a projection selected from a group consisting of: a threaded bolt, a threaded shank, and a stud.

10. A motorcycle saddlebag mounting device removeably attachable to a motorcycle having a front, a rear, a left side, a right side, and left- and right-side footrests removeably attachable to corresponding left- and right-side footrest elements, where the footrest elements are not a swing arm pivot point, the motorcycle saddlebag device comprising:

a left-side elongated member removeably attachable to the left-side motorcycle footrest element, and positioned to extend rearward from the footrest element;

a right-side elongated member removeably attachable to the right-side motorcycle footrest element, and positioned to extend rearward from the footrest element;

a substantially L-shaped left-side member removeably attachable to two left-side motorcycle fender mounting points;

a substantially L-shaped right-side member removeably attachable to two right-side motorcycle fender mounting points, where each substantially L-shaped member comprises a substantially vertically extending portion attachable to a respective one of the left- and right-side elongate members, and a substantially horizontally extending portion having a cantilevered free end, with a bent portion between the substantially horizontally extending portion and the substantially vertically extending portion, such that the substantially horizontally extending portion extends only in one direction from the substantially vertically extending portion; and a coupler, structured to removeably attach the left-side and right-side elongated members and the left-side and right-side substantially L-shaped members together, where each of the left-side and right-side substantially L-shaped members include two motorcycle attachment elements and two saddlebag attachment elements.

* * * * *